United States Patent [19]
Reguiero

[11] Patent Number: 5,347,964
[45] Date of Patent: Sep. 20, 1994

[54] VALVE TRAIN FOR INTERNAL COMBUSTION ENGINES

[75] Inventor: Jose F. Reguiero, Rochester Hills, Mich.

[73] Assignee: Chrysler Corporation, Highland Park, Mich.

[21] Appl. No.: 116,629

[22] Filed: Sep. 7, 1993

[51] Int. Cl.$^5$ .............................. F01L 1/02; F01L 1/18
[52] U.S. Cl. ...................... 123/90.22; 123/90.27; 123/90.42; 123/90.44; 123/302; 123/315; 123/432
[58] Field of Search ............... 123/90.18, 90.22, 90.27, 123/90.39, 90.41, 90.42, 90.44, 302, 315, 422

[56] References Cited
U.S. PATENT DOCUMENTS

| | | | |
|---|---|---|---|
| 4,558,667 | 10/1985 | Inagaki et al. | 123/90.22 |
| 4,617,881 | 10/1986 | Aoi et al. | 123/90.27 |
| 4,676,203 | 6/1987 | Nouno | 123/90.42 |
| 4,686,945 | 8/1987 | Inagaki et al. | 123/90.27 |
| 4,958,604 | 9/1990 | Hashimoto | 123/302 |
| 5,080,057 | 1/1992 | Batzil et al. | 123/90.27 |
| 5,211,143 | 5/1993 | Fontichiaro et al. | 123/90.18 |
| 5,241,928 | 9/1993 | Hamada et al. | 123/90.27 |

OTHER PUBLICATIONS

*Automotive Handbook*, "Internal Combustion Engines", Published by Robert Bosch GmbH, 1986, 2nd Edition, pp. 318–319.

*Primary Examiner*—Tony M. Argenbright
*Assistant Examiner*—Weilun Lo
*Attorney, Agent, or Firm*—Kenneth H. MacLean

[57] ABSTRACT

A valve mechanism for an internal combustion engine with a four-valve, double-overhead camshaft (DOHC) valve train in which the axes of valves for each cylinder diverge outwardly from and are non-parallel with respect to the axis of the cylinder, the valve mechanism having a finger follower for each camshaft lobe and valve and with a contact pad between the cam and the finger follower to permit rocking movement so that the orientation of the finger follower and the axis of the valve remains at a fixed relationship.

2 Claims, 3 Drawing Sheets

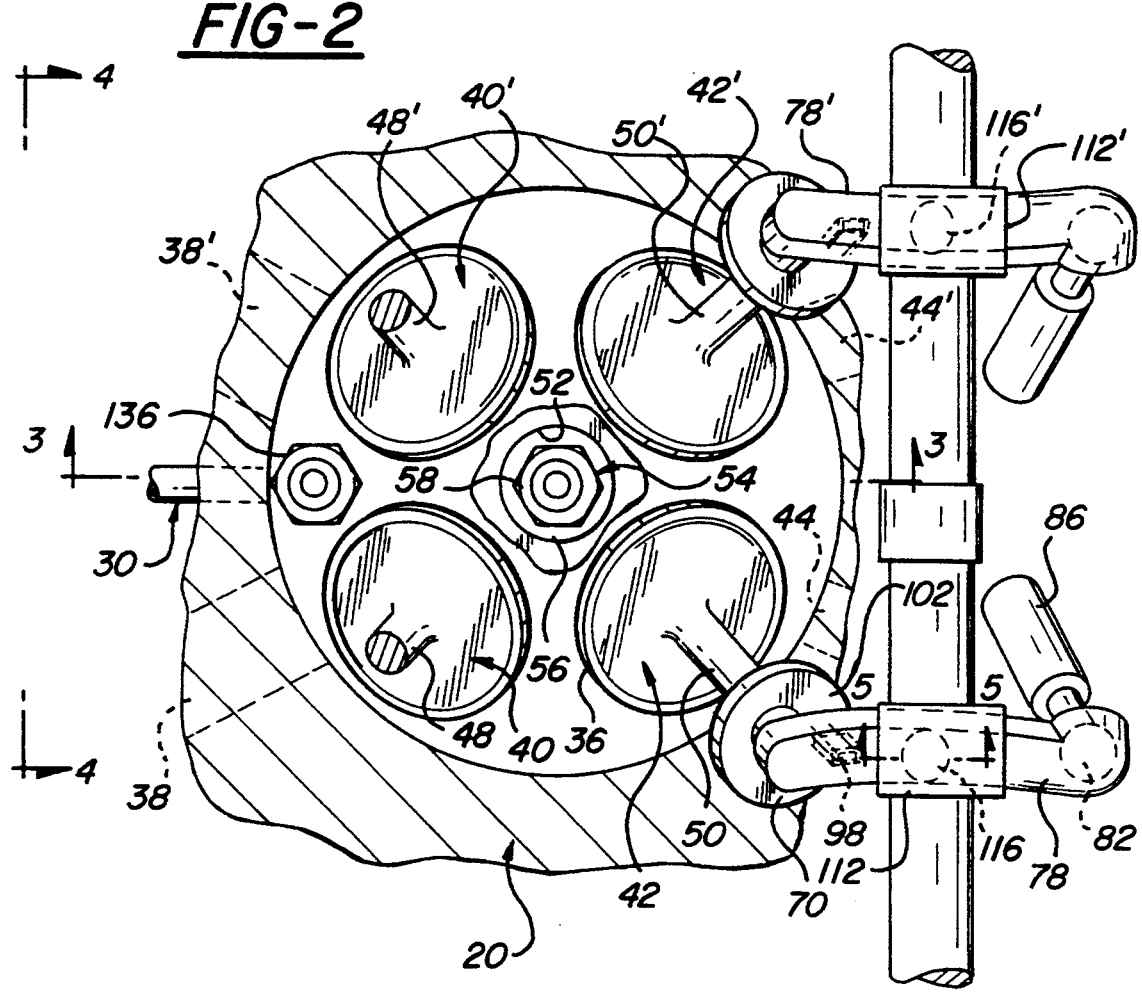
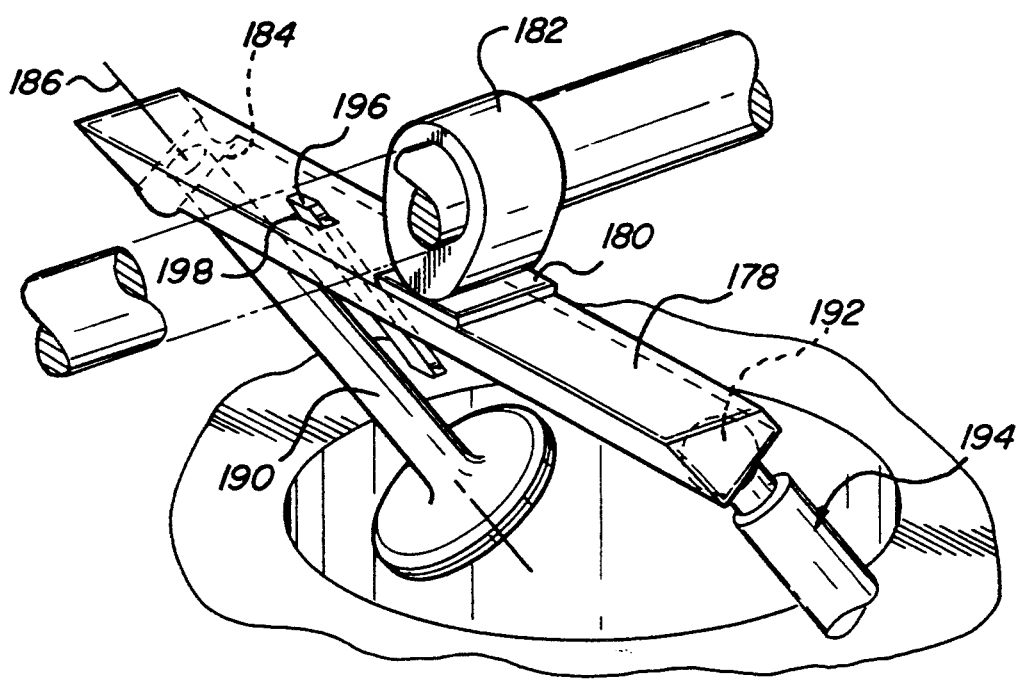

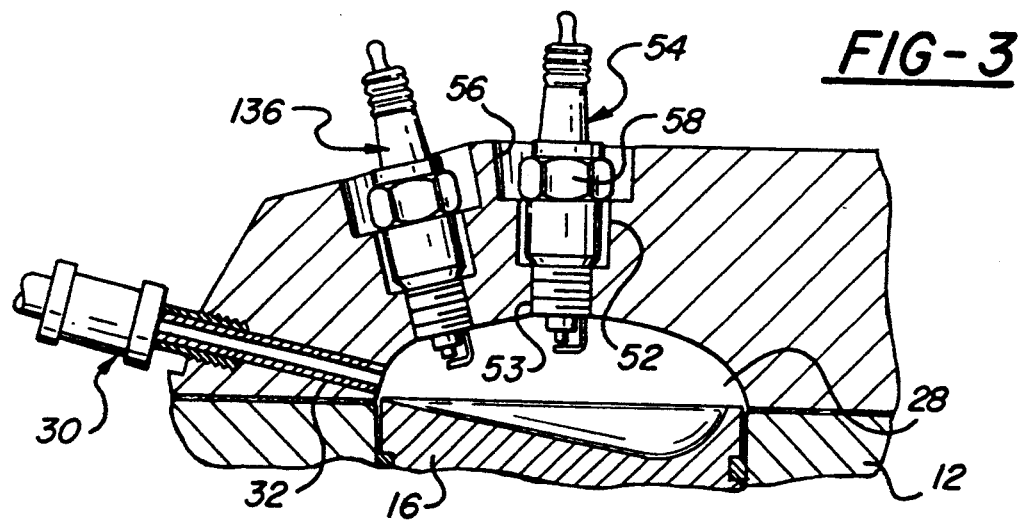
FIG-3
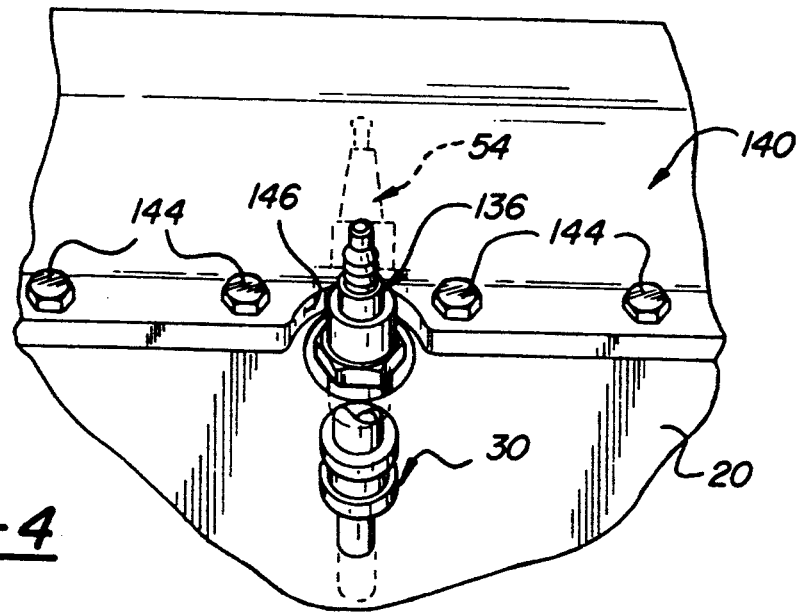
FIG-4
FIG-5
FIG-6
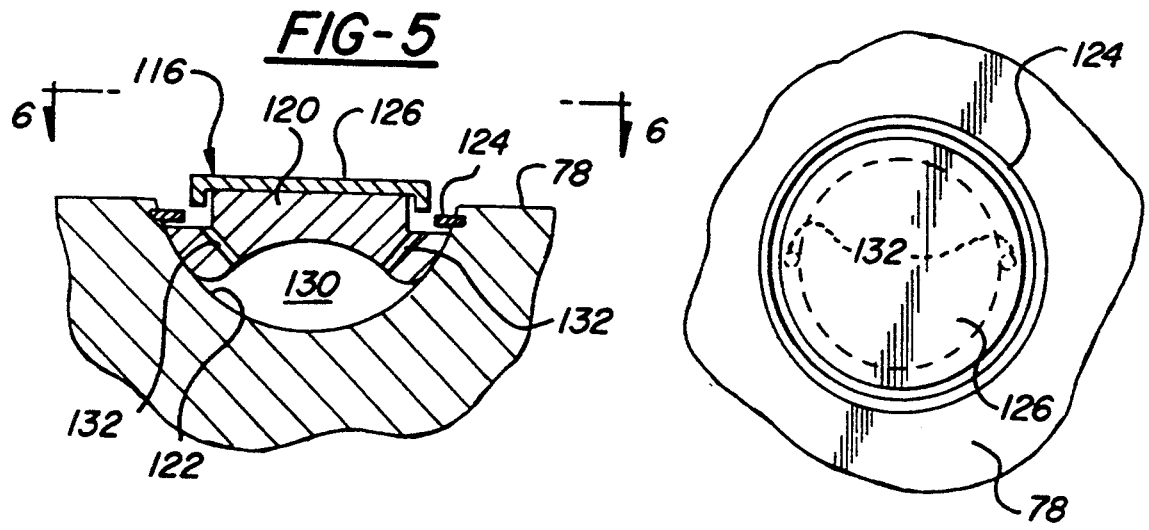

VALVE TRAIN FOR INTERNAL COMBUSTION ENGINES

BACKGROUND OF THE INVENTION

In some multi-valve internal combustion engines, space in the cylinder head is generally so limited that it is insufficient to accommodate additional standard or larger sized fuel injectors, spark plugs or combination thereof needed for optimized operation. This is particularly the case with such engines having dual overhead camshafts.

SUMMARY OF THE INVENTION

To increase space for additional sparking plugs and/or fuel injectors in such engines, the present invention is directed to a new and improved valve train construction which increases cylinder head space to permit the ready employment of such components including economical and readily available plugs and injectors of standard size.

In one preferred embodiment of the invention, each of the intake and exhaust valves of any given combustion chamber is inclined or cambered so that the elongated stems of each of these valves radiate outward from the head in a diverging direction with respect to any of the other stems to a terminus contacted by the aligned inboard end of an associated finger follower. The finger follower is pivoted by action of an overhead rotary camshaft, which follower is effective to exert an axial force aligned with the valve stem to actuate the valve, whose annular valve head is operatively mounted on an associated valve seat in the inner hemispherical wall of the head defining one end of the combustion chamber.

With the valve stems radiating and diverging outwardly from the inner hemispherical wall of the cylinder head, increased space is available in the head for additional sparking plugs including those which are standardized and are commercially available in quantity as well as space for their counter bores permitting easy spark plug installation and removal for servicing purposes. Additionally, this diverging and radiating valve design provides increased space in the head for standardized or other fuel injectors, in cases where the combustion system requires such additional hardware.

For effective valve operation and long service life, the finger followers for each valve is pivoted at one end to a suitable finger follower support shaft, such as a hydraulically compensated mounting. These finger followers are angulated or tilted along their longitudinal axes to match the angle of the associated valve stem and the finger follower support shaft so that resulting apply force for actuating the associated valve is aligned with the axis of the valve. Each finger follower is accordingly in alignment with the valve stem and is turned on its pivot by an associated cam fixed on a rotatable camshaft so that the free end thereof contacts the outer end of the valve to effect proper valve operation.

Since the cams on the camshaft, which are employed to actuate the valves, are mounted on camshafts parallel to one another and to the axis longitudinal of the engine, direct side loads may be imparted by the rotating cams to cam or tappet pads on the finger followers. In a first embodiment these pads are designed to oscillate or turn in response to cam action thereon to accommodate any side loads to thereby minimize frictional wear of the pads.

In a second embodiment of the invention, the finger followers are made with upper surfaces which are essentially perpendicular to the apexes or noses of the cam lobes and have cross-sectional configuration so that the need for special oscillating pads is minimized or eliminated.

With both embodiments of the invention, a new and improved valve train assembly is provided for internal combustion engines which allows sufficient space for sparking plugs and fuel injectors including those of standard sizes and which allows design freedom to increase the size and number of valves for any given cylinder.

BRIEF DESCRIPTION OF THE DRAWINGS

These and other features, object and advantages of this invention will be more apparent from the following Detailed Description and drawing in which:

FIG. 2 is a diagrammatic pictorial type top view taken generally along sight lines 2—2 of FIG. 1 with some parts removed and with parts broken away;

FIG. 3 is a cross-sectional view taken generally along sight lines 3—3;

FIG. 4 is a sectional view taken generally along lines 4—4 of FIG. 2 with parts removed;

FIG. 5 is cross-sectional view taken generally along lines 5—5 of FIG. 2 with parts removed to show details of the finger follower construction;

FIG. 6 is a top view of a portion of the finger follower taken generally along sight lines 6—6 of FIG. 5; and FIG. 7 is a pictorial view illustrating a portion of the valve train of a second embodiment of the invention.

DETAILED DESCRIPTION OF THE DRAWINGS

Figure 1:
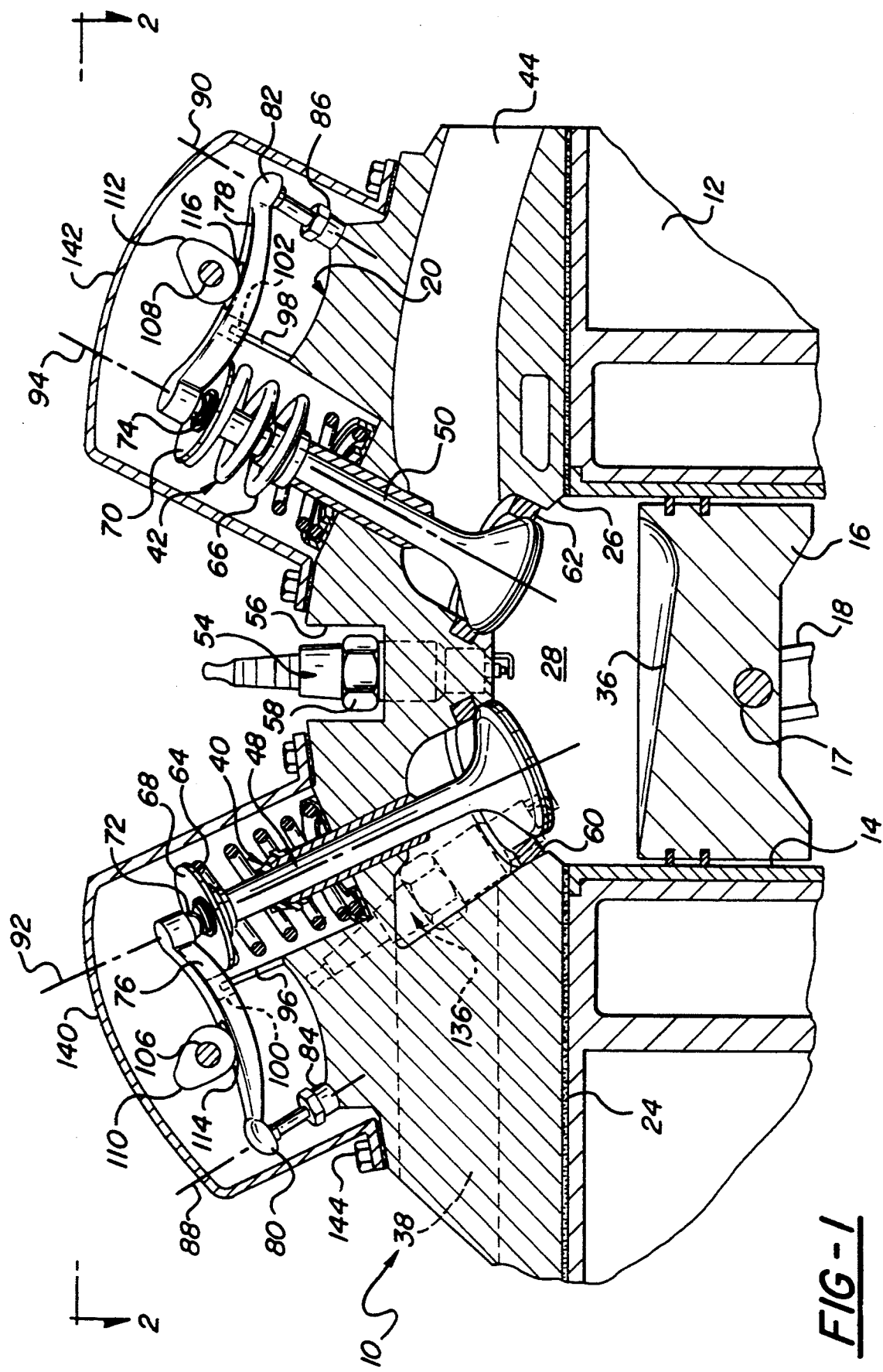
FIG. 1 is a view partially in section of a portion of the engine block and head of an internal combustion engine.

Turning now in greater detail to the drawings, there is shown in FIG. 1 a section of an internal combustion engine 10 having an engine block 12 with a plurality of cylinders therein exemplified by sleeved cylinder 14. Operatively mounted for reciprocation in each of these cylinders is a piston, such as piston 16, connected to the engine crankshaft not shown by a piston pin 17 and connecting rod 18.

Secured to the top of the engine block 12 is a cylinder head 20 tightened down by bolts, not shown to the engine block and other components so that cylinder head gasket 24 effects a fluid tight fitting between the engine block and the cylinders.

The cylinder head 20 is formed with a plurality of hemispherical recesses, such as identified by reference 26, which align with the bores defining the cylinders which together or in combination with associated pistons form combustion chambers, such as chamber 28.

In one combustion system in which additional fuel injection and ignition devices are needed, the combustion chamber is fed with fuel such as gasoline through a fuel injector 30, secured in an inclined bore 32 in the cylinder head, that injects fuel into the combustion chamber 28.

The injectors 30 are conventional hydraulic-type injectors. The bottom surface defining the lower end of chamber 28 is formed by a tear-shaped recess or depression 36 provided in the upper surface of piston 16. The upper end of each chamber is formed by the hemispherical recess 26 formed in the head.

Air is supplied to the combustion chambers 28 through air intake passages 38, 38' and intake valves 40, 40' operatively mounted in the cylinder head. Combustion gases are exhausted from chamber 28 through the exhaust valves 42, 42' and associated exhaust passages 44, 44'. These latter passages and valves are directly across from the intake passages and intake valves to provide a cross-flow type cylinder head.

Importantly in this invention, the elongated stems 48, 48' and 50, 50' of the intake and exhaust valves, respectively, radiate outward and diverge from one another as pictorially illustrated in the top view of FIG. 2. This radiating divergence provides additional space in the cylinder head so that the cylinder head can be made with a sufficiently large diameter opening 52 partially threaded at 53 in a central area thereof to accommodate a standard sized or "off shelf" main spark plug 54 or a fuel injector. Some combustion systems require a spark plug or a fuel injection device which may be of much larger diameter or size than a standard spark plug or fuel injector and this invention provides the space therefor. With this invention a counter bore 56 for opening 52 provide clearance 56 to allow a socket wrench, or other suitable tooling, to be placed over the polygonal nut 58 formed integrally with the spark plug for turning the threaded plug into and out of its opening.

In the installed position, the electrodes of the sparking plugs 54 are strategically disposed in the combustion chamber to ignite the air fuel mixture fed thereto.

The intake and exhaust valves 42, 42', 44 44', respectively, have inner annular valve heads which, when seated on the annular valve seats, such as shown at 60, 62 in FIG. 1, seal the combustion chamber 28. This seating is effected by action of preloaded helical springs 64, 66 seated on the cylinder head 20 that engage the annular retainers 68, 70 which are secured adjacent to the outer ends of the elongated stems 48, 50 of the intake and exhaust valves by keepers of standard design, not shown. The ends of the valve stems are engaged by end contacts 72 and 74, respectively, of finger followers 76 and 78 that are mounted for turning or rocking movement in angular planes by ball and socket pivots 80, 82 of angular extending finger follower supports 84 and 86. These supports may be conventional hydraulically compensated mounts operatively supported in the cylinder head, as best shown in FIG. 1. Preferably, the axes 88 and 90 of these supports are respectively inclined and parallel with the axes 92, 94 of the intake and exhaust valves 40, 42. Pins 96 and 98 extend from the cylinder head through aligned slots 100, 102 in the finger followers and are parallel to the axes of the valves and the finger follower support and serve as guides so that the finger followers are maintained in their tilted position and their contacts 72, 74 align with the axis of their associated valves.

Disposed immediately above the intake and exhaust valve finger followers 76 and 78, are longitudinally extending intake and exhaust valve camshafts 106 and 108 supported in conventional bearings and are rotatably driven by the engine through timing gear, chain or belt constructions which are conventional and are not shown. The camshafts have conventional lobes thereon, exemplified by lobes 110, 112 and 112' associated with respective intake and exhaust valve finger followers 76, 78 and 78', and such cam lobes contact and act on pads 114, 116 and 116' mounted for limited pivoted movement in the upper surfaces of the associated finger followers to effect the timed pivotal movement thereof to operate the valves against the action of their closure springs.

In view of the tilting of the finger followers along their major longitudinal axes so that the finger followers align with and intersect the axes of the valves and the finger follower supports, the pads are mounted so that they can oscillate or pivot under side loads imparted thereto from the cams. Accordingly, as the cams rotate, the pads turn to accommodate any side load imparted thereto to eliminate or reduce wear.

FIGS. 5 and 6 show details of one of the pads which has a generally hemispherical body 120 fitted into an accommodating hemispherical recess 122 and secured therein for limited pivotal movement by a snap ring 124. Annular valve adjusting discs 126 are fitted over the outer cylindrical heads of the pads. These discs are designed for easy installation and replacement during assembly or for service, such discs may be of different thicknesses for adjustment purposes. The lower surface of the pad body 120 of the pad is concave to form a pocket 130 for lubricating oil. Passages 132 can be drilled in the bodies to allow the lubricant to readily enter the pocket. This lubricant provides an anti friction film between the body and recess 122 to reduce friction and wear therebetween.

In addition to providing more space in the head for the main sparking plug 54 or other device such as a fuel injector, additional space is provided for a conventional-size sparking plug 136 and the threaded bore and counter bore therefor for pre-ignition of the fuel charge. As best illustrated in FIG. 4, the conventional fuel injectors 30 are mounted in the head so that the injected plume of fuel can be initially ignited by sparking plug 136, in one application of this invention.

The covers 140, 142 are secured to the head by suitable threaded fasteners 144. As shown in FIG. 4, the head covers could be formed with appropriate recesses 146 to provide ready access to sparking plug 136, or spark plug wells of conventional design can be used underneath and through the cover (not shown) to prevent oil from flooding the spark plug well.

In FIG. 7, elongated finger followers 176 with quadrilateral cross-section are designed to replace finger followers such as followers 76 and 78 of the first embodiment. These finger followers have flattened upper surfaces 178 which accommodate flat contact discs 180 mounted thereon that have square contact with their associated cam lobes 182 which correspond to the cam lobes of the first embodiment that are fixed to the engine driven camshafts. With this arrangement, there are no appreciable side loads imparted to the discs so that they can be secured in a fixed position on the finger follower. The lower surface 184 of these finger followers 176 are angled to be perpendicular to the axes 186 of the stem 188 of the valve 190. With this arrangement, the operating force of the finger follower when pivoted on pivot 192 of its mounting 194 will align with the axis 186 for optimized valve opening. Pin 196 extends from securement in the head through alignment slot 198 in the finger follower to maintain the finger follower in its offset position so that the angular lower surface 184 is perpendicular to the mount 194 and valve stem 188.

To install the additional plugs and/or injectors on one side of the chambers, the associated adjacent valves could be cocked while the valves on the other side of the chamber could be aligned conventionally with their stems parallel to each other and directly actuated from a camshaft for a simpler even more economical approach.

While a preferred embodiment of the invention has been shown and described, other embodiments will now become apparent to those skilled in the art. Accordingly, this invention is not to be limited to that which is shown and described but by the following claims.

What is claimed is:

1. A valve train for opening and closing combustion chambers of a spark ignition internal combustion engine having an engine block with cylinders therein and a piston operatively mounted in each of said cylinders to define one end portion of a respective combustion chamber therein, a cylinder head operatively mounted on said block and having curved recesses therein aligned with said cylinders to define respective second end portions of said combustion chambers, and air intake and gas exhaust valves provided in said head, including at least first and second intake valves and first and second exhaust valves, valve seats for each of said valves, each of said valves having an enlarged sealing head portion fir operative engagement with an associated one of said valve seats and having an elongated stem portion extending from connection with said sealing head portion through associated stem openings in said cylinder head, each of said stem portions defining an axis and each being inclined so as to diverge away from the axis of any other of said stem portions to thereby define space therebetween to accommodate sparking plugs for said combustion chambers, an elongated finger follower for each of said valves, a cam associated with each of said finger followers which are mounted for movement in a plane angulated with respect to the axis of said associated valve, a contact pad for each of said cams and mounting means supporting said contact pads in said associated finger follower to permit rocking movement of said contact pad relative to said finger follower in response to a loading of said contact pad by an associated cam.

2. The valve train mechanism as set forth in claim 1 and including guide means operatively active with each of said finger followers to maintain a set angular orientation of said finger follower with respect to said valve stem portion.

* * * * *